Patented Dec. 15, 1942

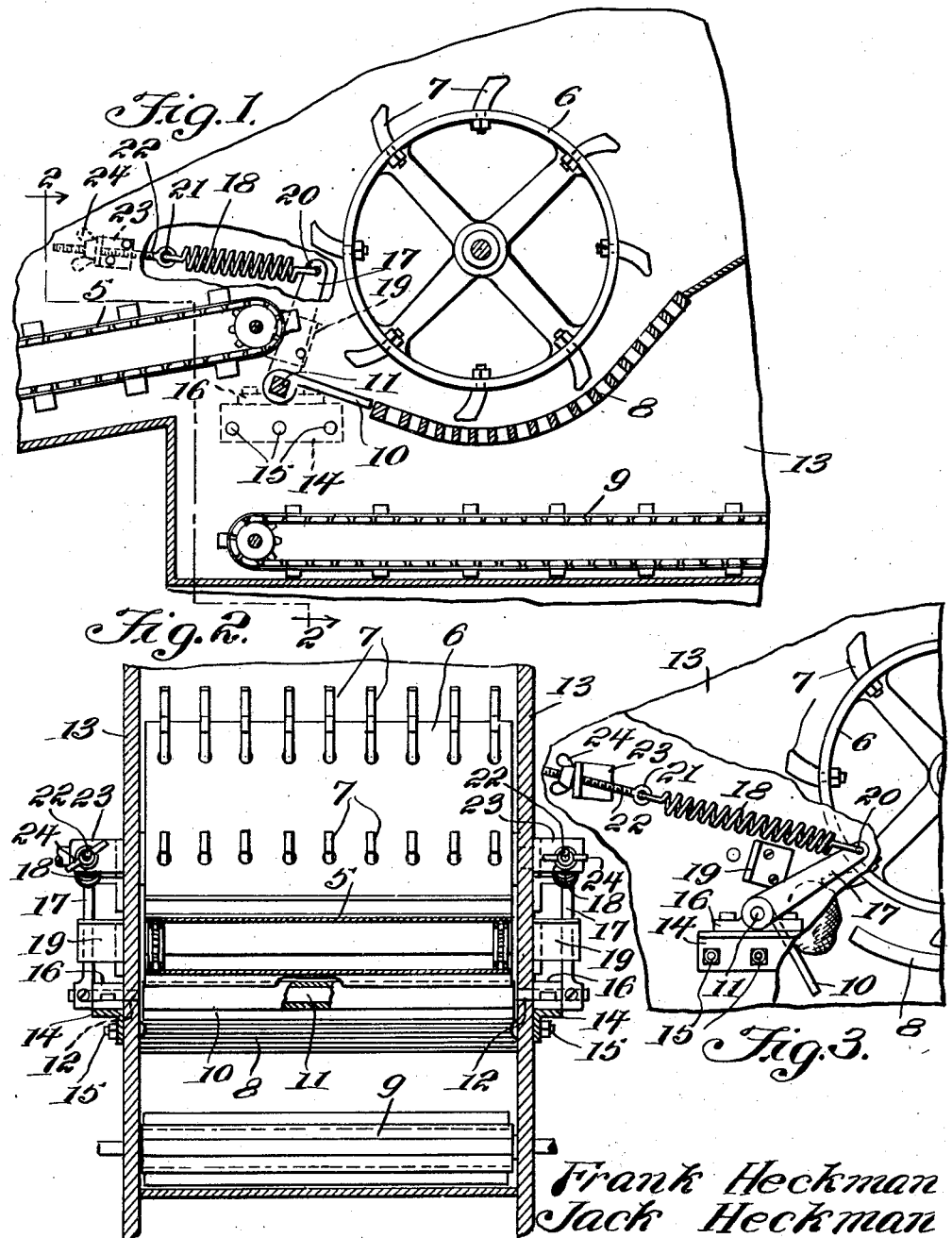

2,305,159

UNITED STATES PATENT OFFICE 2,305,159

ATTACHMENT FOR THRESHING MACHINES

Frank Heckman and Jack Heckman, Bisbee, N. Dak.

Application August 4, 1941, Serial No. 405,402

1 Claim. (Cl. 130—27)

The present invention relates to an attachment for threshing machines primarily designed for removing foreign substances such as stones, parts of machinery and the like from the grain being fed through the machine.

The primary object of the invention is to provide a plate yieldably held in front of the concave of a thresher which, when contacted by relatively heavy articles such as stones, will drop out of alignment with the concave so as to deposit such articles beneath the machine thereby preventing damage to the concave and cylinder mounted thereabove.

Another object of the invention is to provide a plate having the above characteristics that is readily adjustable from the exterior of the machine so as to adapt the plate for various weights of grain being fed to the cylinder and concave.

The invention also consists in certain other features of construction and in the combination and arrangement of the several parts, to be hereinafter fully described, illustrated in the accompanying drawing and specifically pointed out in the appended claim.

In describing our invention in detail, reference will be had to the accompanying drawing wherein like characters denote like or corresponding parts throughout the several views, and in which:

Figure 1 is a view in vertical section of a portion of a threshing machine showing the attachment applied thereto.

Figure 2 is a vertical sectional view taken substantially on line 2—2 of Figure 1.

Figure 3 is an enlarged fragmentary sectional view illustrating the position of the attachment when discharging a stone.

Referring to the drawing for a more detailed description thereof, there is shown fragmentarily a portion of a conventional threshing machine which includes a conveyor 5 on which the grain is deposited to be fed for action by the cylinder 6, which cylinder is formed with spaced teeth 7 for agitating and beating the grain whereby the loose particles of grain will be forced downwardly through the concave 8. A carrier 9 is provided beneath the concave which receives the grain from the concave and deposits the same in suitable receptacles, not shown. The parts just described are of conventional construction and form no part of the present invention.

Quite frequently in the feeding of the material to the cylinder 6, stones and the like will be accidentally included in the mass. In such cases, the straw passing through at the same time will not be perfectly threshed, and injury is likely to result to the concave or to the threshing cylinder. In accordance with the present invention, a plate 10 having its upper face flush with the upper face of the concave, is mounted in front of the threshing cylinder 6 and extends entirely across the cylinder. The rear edge of the plate 10 is formed with a square-shaped opening for receiving the shaft 11, which shaft is substantially square-shaped in cross section and forms the means of pivotally supporting the plate 10. The ends of the shaft 11 are reduced in diameter and extend through openings 12 formed in the side walls 13 of the threshing machine. L-shaped brackets 14 are secured by bolts or similar means 15 to the outer face of the walls 13 and support bearing plates 16 in which the ends of the shaft 11 are disposed. An arm 17 is attached to each end of the shaft 11 adapted to control movement of the plate 10 as will hereinafter appear. The normal position of the plate 10 and arms 17 is shown in Figure 1 of the drawing where it will be noted that the upper face of the plate 10 is substantially in line with the upper face of the concave 8. The arm 17 moves toward the cylinder 6 upon contact of a heavy article with the plate 10 against the tension of the spring 18. The return movement of the arm 17 is limited by means of the stop plates 19 which are attached to and extend from the walls 13. When the arms 17 are in contact with the plates 19, the plate 10 will always be in alignment with the concave 8.

The tension springs 18 have one end attached to the arms 17 as indicated at 20 with their other ends attached to an eye bolt 22 as indicated at 21, said bolt extending through a bracket 23 and supporting on the outer end thereof wing nuts 24. Tightening or loosening the wing nuts 24 will increase or decrease the tension of the springs 18. It will be noted that the brackets 23, plates 19 and L-shaped brackets 14 are all attached on the outer face of the walls 13 so as to be readily accessible for adjustment.

When a stone or similar heavy article leaves the grain carrier 5 and comes in contact with the plate 10, the teeth of the cylinder 6 will strike the article to drive the plate 10 downwardly against the tension of the springs 18 in the manner shown in Figure 3 of the drawing. After the article has passed through the opening, the tension of the springs 18 will return the plate 10 to its normal position, movement of the arm 17 in a rearward direction being limited by the plates 19. The opening and closing of the plate 10 is substantially instantaneous thereby precluding the possibility of any appreciable quantity of straw being discharged through the opening formed by the plate 10 with the stone. After passing through the opening, the stone will be deposited onto the grain pan carrier 9 for discharge from the machine.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed is:

In a threshing machine having a horizontal rotary thrashing cylinder mounted thereon, a concave spaced from the lower portion of the cylinder, a feed conveyor supported on the machine and having its discharge end disposed above and spaced horizontally from the front end of the concave, a horizontal pivot shaft mounted below the discharge end of the conveyor parallel with and spaced from the front end of the concave, a plate fixed to the said shaft and disposed to normally extend between the shaft and the front end of the concave coextensive with the concave, an arm fixed to and extending radially from the shaft, a tension spring having one end fastened to the outer end of the arm, a bolt attached to the opposite end of the spring and extending through an opening in a guide bracket secured on the machine, and a nut threadedly engaging the said bolt and bearing against the outer side of the bracket for adjusting the tension of the spring.

FRANK HECKMAN.
JACK HECKMAN.